(12) United States Patent
Nasserrafi et al.

(10) Patent No.: US 9,995,247 B2
(45) Date of Patent: Jun. 12, 2018

(54) HYBRID THRUST REVERSER INNER WALL FOR AIRCRAFT ENGINES

(71) Applicant: SPIRIT AEROSYSTEMS, INC., Wichita, KS (US)

(72) Inventors: Rahbar Nasserrafi, Andover, KS (US); Craig Clasper, Derby, KS (US); Micheal A. Walker, Wichita, KS (US); Gerald E. Hicks, Wichita, KS (US); Linda Cadwell Stancin, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 445 days.

(21) Appl. No.: 14/875,897

(22) Filed: Oct. 6, 2015

(65) Prior Publication Data
US 2017/0096964 A1   Apr. 6, 2017

(51) Int. Cl.
| | |
|---|---|
| *B32B 15/00* | (2006.01) |
| *C25D 7/00* | (2006.01) |
| *F02K 1/82* | (2006.01) |
| *C25D 3/04* | (2006.01) |
| *C25D 3/12* | (2006.01) |
| *C25D 3/38* | (2006.01) |

(Continued)

(52) U.S. Cl.
CPC ............. *F02K 1/822* (2013.01); *B32B 15/00* (2013.01); *C23C 26/00* (2013.01); *C25D 3/04* (2013.01); *C25D 3/12* (2013.01); *C25D 3/38* (2013.01); *C25D 3/54* (2013.01); *C25D 3/56* (2013.01); *C25D 3/562* (2013.01); *C25D 3/58* (2013.01); *C25D 7/00* (2013.01); *B32B 2305/024* (2013.01); *F02K 1/72* (2013.01); *F05D 2230/30* (2013.01); *F05D 2230/90* (2013.01); *F05D 2300/172* (2013.01); *F05D 2300/177* (2013.01); *F05D 2300/5024* (2013.01); *F05D 2300/603* (2013.01)

(58) Field of Classification Search
CPC ................. F09D 2230/30; B32B 15/00; B32B 2305/024; C25D 7/00
See application file for complete search history.

(56) References Cited

U.S. PATENT DOCUMENTS

| | | | | |
|---|---|---|---|---|
| 3,683,488 | A | * | 8/1972 | Cook ..................... B21D 47/00 205/114 |
| 3,753,843 | A | * | 8/1973 | Hutchison ........... B29C 44/1266 156/242 |

(Continued)

*Primary Examiner* — Liam J Heincer
(74) *Attorney, Agent, or Firm* — Hovey Williams LLP

(57) ABSTRACT

An aircraft thrust reverser inner wall and method of manufacturing the same. The aircraft thrust reverser inner wall may include a face sheet, a perforated back sheet, and a core sandwiched between the face sheet and the perforated back sheet. The face sheet may have an inner face sheet surface and an outer face sheet surface, and the core may have an inner core surface, an outer core surface, and a plurality of cell walls extending therebetween. An electro-depositable material may be applied, via electrodeposition, in a substantially continuous layer over the outer core surface, the cell walls, and the outer face sheet surface, thus bonding the face sheet and core together. The perforated back sheet may be attached to the core at the outer core surface, and a conductive coating may be applied to the inner face sheet surface.

20 Claims, 4 Drawing Sheets

(51) Int. Cl.
  *C25D 3/54* (2006.01)
  *C25D 3/56* (2006.01)
  *C25D 3/58* (2006.01)
  *C23C 26/00* (2006.01)
  *F02K 1/72* (2006.01)

(56) References Cited

U.S. PATENT DOCUMENTS

| | | | | |
|---|---|---|---|---|
| 4,427,497 | A * | 1/1984 | Heinz | B29D 11/00596 |
| | | | | 205/114 |
| 4,522,859 | A * | 6/1985 | Blair | B23K 1/0014 |
| | | | | 181/292 |
| 4,567,076 | A * | 1/1986 | Therrien | B32B 7/02 |
| | | | | 156/148 |
| 4,658,623 | A * | 4/1987 | Blanyer | B21C 23/24 |
| | | | | 72/257 |
| 4,869,421 | A * | 9/1989 | Norris | B23K 1/0014 |
| | | | | 228/181 |
| 5,251,435 | A * | 10/1993 | Pauley | B64D 29/00 |
| | | | | 244/54 |
| 5,603,471 | A * | 2/1997 | Armstrong | B64D 29/00 |
| | | | | 239/265.31 |
| 6,051,302 | A * | 4/2000 | Moore | B29C 70/08 |
| | | | | 239/265.19 |
| 6,096,416 | A * | 8/2000 | Altenberg | B32B 3/06 |
| | | | | 156/78 |
| 2010/0074726 | A1* | 3/2010 | Merrill | F01D 5/288 |
| | | | | 415/115 |
| 2012/0167390 | A1* | 7/2012 | Rice | F01D 5/282 |
| | | | | 29/889.71 |
| 2016/0122031 | A1* | 5/2016 | Nasserrafi | B21D 47/04 |
| | | | | 228/157 |
| 2016/0280355 | A1* | 9/2016 | Deichert | B32B 37/12 |

* cited by examiner

HYBRID THRUST REVERSER INNER WALL FOR AIRCRAFT ENGINES

BACKGROUND

Modern day aircraft engines operate at extremely high temperatures, thus subjecting the aircraft's supporting propulsion hardware, such as pylons and nacelles, to these high temperatures. Furthermore, in some nacelle designs, adequate space is not available to effectively dissipate this heat or insulate the surrounding structure from the effects thereof.

Some nacelles use titanium thrust reverser inner walls to withstand these high engine temperatures and titanium alloys that are resistant to attack by exposure to hydraulic fluids at elevated temperatures. However, thrust reversers made predominantly from titanium and titanium alloys are expensive, heavy, and difficult to fabricate.

Other nacelles use inner walls made from composite materials such as carbon fiber-epoxy. However, these nacelles require external heat shielding to protect the composite materials from engine heat. Such heat shielding adds weight and consumes valuable space, while not contributing to the inner wall's structural performance. Furthermore, external heat shielding requires periodic inspection and maintenance.

Thus, there is a need for an aircraft nacelle that sufficiently withstands commercial aircraft engine temperatures, but is also economical to form and easier to maintain and manufacture than prior art thrust reversers.

SUMMARY OF THE INVENTION

Embodiments of the present invention solve the above-mentioned problems and provide a distinct advance in the art of manufacturing thrust reverser inner walls having improved performance and heat resistance.

One embodiment of the invention is a method of manufacturing an aircraft thrust reverser inner wall, including the steps of forming a face sheet to a desired shape and placing a core onto the face sheet. The face sheet may have an inner face sheet surface and an outer face sheet surface, opposite of the inner face sheet surface, and the core may be placed onto the outer face sheet surface. The core may include an inner core surface, an outer core surface, and a plurality of cell walls extending between the inner core surface and the outer core surface. Next, the method may include a step of electrodepositing an electro-depositable material, such as nickel, substantially continuously over the outer core surface, the cell walls, and the outer face sheet surface, thereby bonding the face sheet and core together. Then, the method may include a step of attaching a back sheet to the core at the outer core surface, thereby sandwiching the core between the face sheet and the back sheet.

Another embodiment of the invention is an aircraft thrust reverser inner wall. The aircraft thrust reverser inner wall may include a face sheet, a perforated back sheet, and a core sandwiched between the face sheet and the perforated back sheet. The face sheet may have an inner face sheet surface and an outer face sheet surface, and may be shaped to fit around at least a portion of an aircraft engine. The core may have an inner core surface, an outer core surface, and a plurality of cell walls extending between the inner core surface and the outer core surface. The aircraft thrust reverser inner wall may further include an electro-depositable material, applied via electrodeposition in a substantially continuous layer over the outer core surface, the cell walls, and the outer face sheet surface, thus bonding the face sheet and core together. The perforated back sheet may be attached to the core at the outer core surface. Furthermore, in some embodiments of the invention, a thermally conductive coating may be deposited/bonded to the inner face sheet surface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
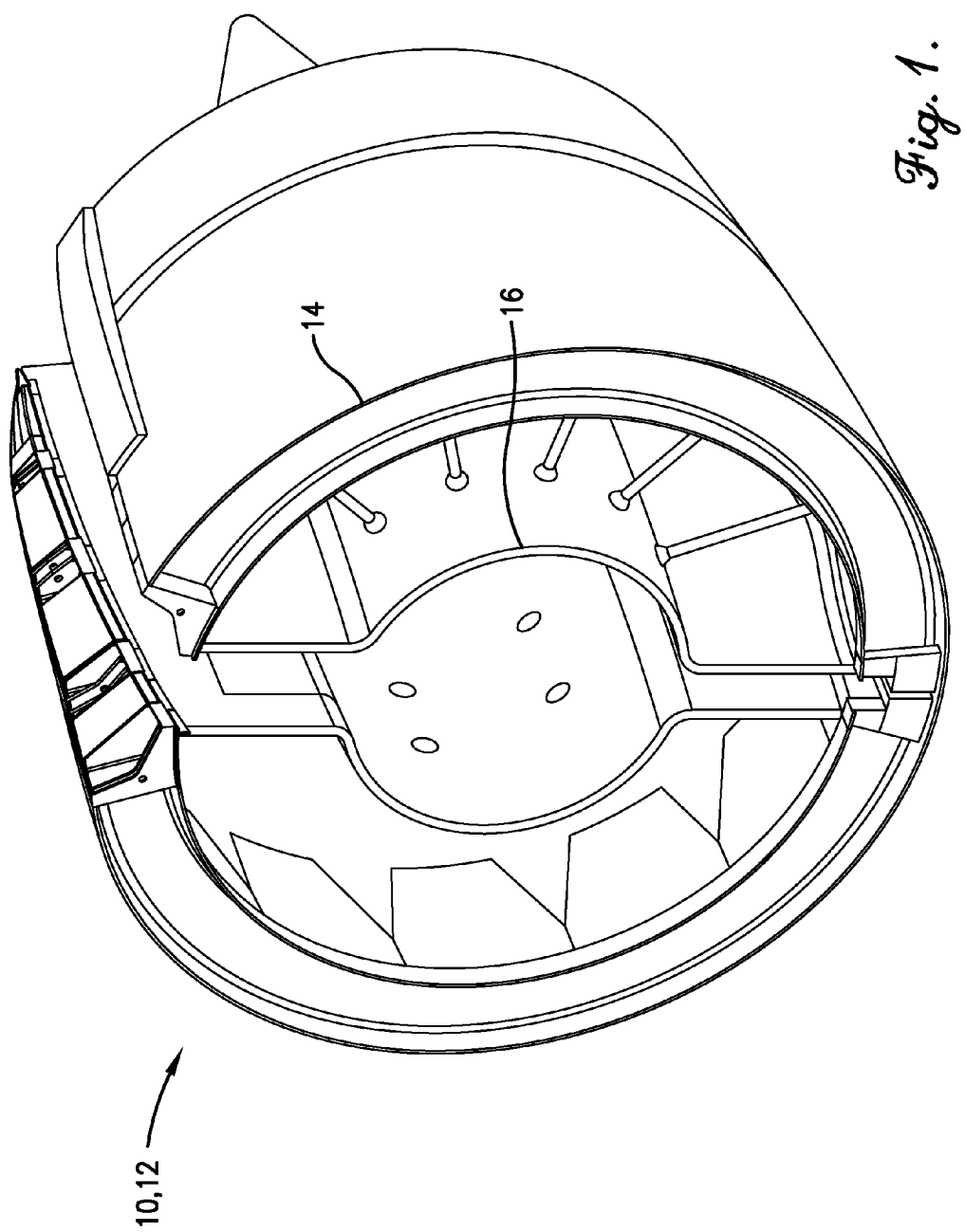
FIG. 1 is a perspective view of an aircraft nacelle having at least one inner thrust reverser wall constructed according to embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
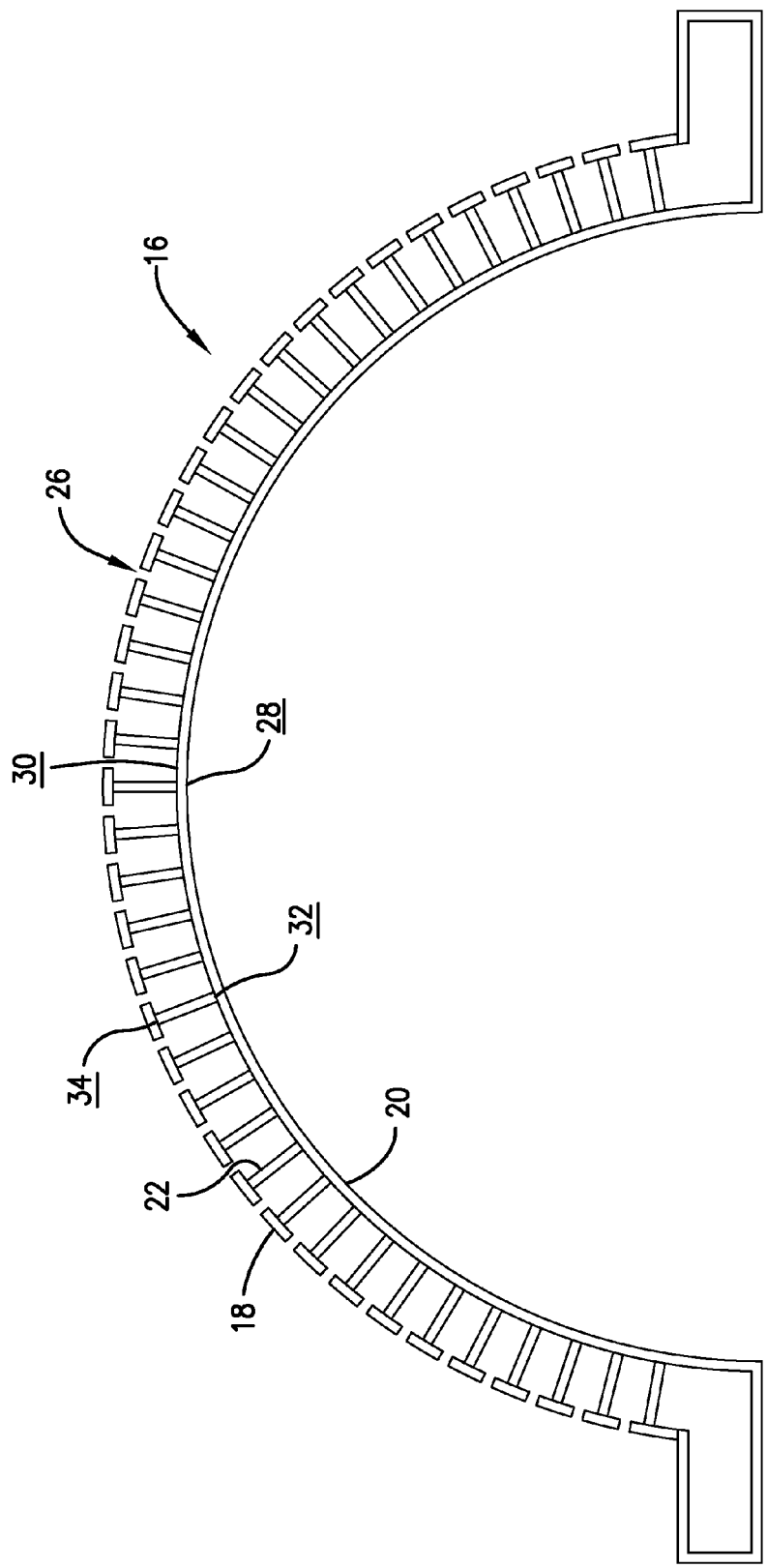
FIG. 2 is a schematic end view of one of the inner thrust reverser walls of FIG. 1.
Figure 3:
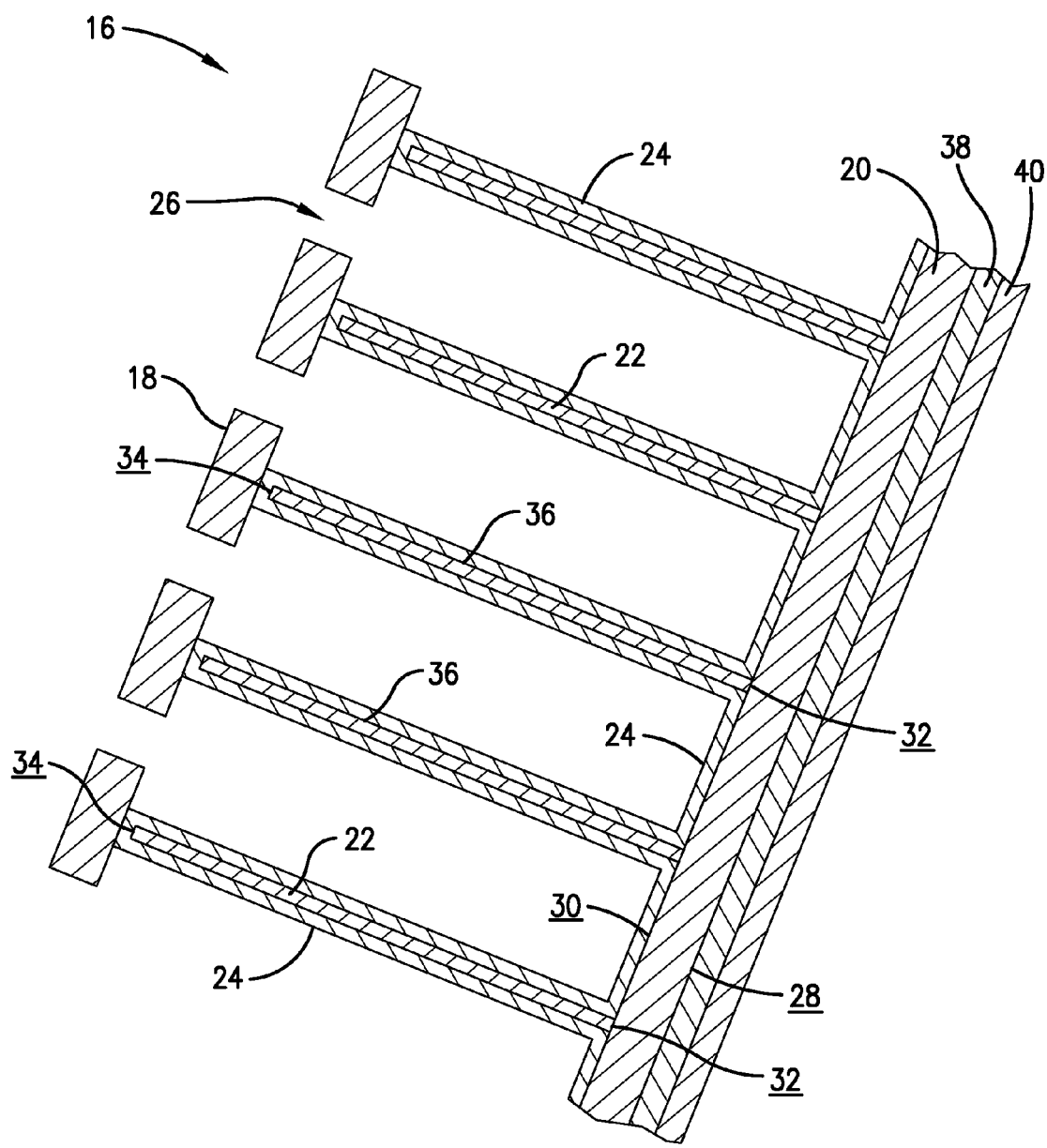
FIG. 3 is a fragmentary cross-sectional view of the inner thrust reverser wall illustrated in FIG. 2, with additional thermal barrier layers applied.

An aircraft nacelle 10 having a thrust reverser 12 constructed in accordance with embodiments of the present invention is illustrated in FIGS. 1-3. The thrust reverser 12 includes an outer wall 14 and an inner wall 16. The outer wall 14 may be made of any conventional materials and in any conventional manner. The inner wall 16 may comprise a back sheet 18, a face sheet 20, a core 22, and an electro-depositable material 24, as illustrated in FIG. 3, attaching the face sheet 20 to the core 22.

The back sheet 18, as illustrated in FIGS. 2 and 3, may be a perforated sheet of material with any type and quantity of perforations 26 or holes formed therethrough. In some embodiments of the invention, the back sheet 18 may be made of carbon fiber reinforced plastic composite (CFRP), aluminum (Al), glass reinforced epoxy (GRE), titanium, any type of polymer matrix composite (PMC), or the like.

The face sheet 20 may be substantially continuous and/or not perforated, and may be formed of one or more of the following materials: Al, CFRP, GRE, matrix metal composite (MMC), any type of PMC, titanium, nickel base alloy, corrosion resistant steel, stainless steel, or the like. The face sheet 20 may include an inner face sheet surface 28 and an outer face sheet surface 30 opposite the inner face sheet surface 28.

The core 22 may be a honeycomb core, as known in the art of aircraft component manufacture. For example, the core 22 may be made of aluminum alloys, CFRP, GRE, titanium alloy, nickel base alloy, and the like. In some embodiments of the invention, the core 22 may be a welded or brazed aluminum, titanium, or composite core. The core 22 may have an inner core surface 32 and an outer core surface 34 with a plurality of cell walls 36 extending therebetween. The cell walls 36 may be connected or integrally-formed to define a plurality of cells having any shape, such as a hexagonal shape or any geometric shape desired for a particular application. The face sheet 20 may be located on the inner core surface 32 and the back sheet 18 may be located on the outer core surface 34.

The electro-depositable material 24, as illustrated in FIG. 3, may be any material suitable for electrodeposition, also referred to herein as electroplating. For example, the electro-depositable material 24 may include one or more of the following: nickel, nickel-iron (e.g., INVAR™), nickel base alloys, chromium and chromium base alloys, cobalt and cobalt base alloys, copper and copper base alloys, niobium or tantalum alloys, and the like. A continuous layer of the electro-depositable material 24 may coat the outer face sheet surface 30, and at least a portion of the cell walls 36, thus bonding the face sheet 20 to the cell walls 36 of the core, as illustrated in FIG. 3. In some embodiments of the invention, the continuous layer of electro-depositable material 24 may coat the outer face sheet surface 30, the entirety of the cell walls 36, and the outer core surface 34. Advantageously, the use of electro-depositable material to form a structural joint between the face sheet 20 and core 22 may enhance the transfer of heat therebetween relative to other means of attachment such as adhesive bonding. Additional bonding or adhesion techniques may or may not be used to attach portions of the inner core surface 32 to the face sheet 20. Additionally or alternatively, mechanical holding devices may be used to hold the core 22 in a desired position relative to the face sheet 20 while the electro-deposited material is being applied.

The back sheet 18 may be bonded to the outer core surface 34 via laser welding, adhesive bonding, mechanical attachment, or any other attachment methods known in the art. In some embodiments of the invention, a layer of the electro-depositable material 24 may also be deposited on the outer core surface 34, such that the electro-depositable material 24 is located between the core 22 and the back sheet 18.

In some embodiments of the invention, additional materials may be applied onto the inner face sheet surface 28, as illustrated in FIG. 3. For example, a thermally conductive coating 38, such as a metallic exoskeleton, may be applied or electrodeposited onto the outer face sheet surface 30. For example, the metallic exoskeleton may be made of the same material as described above for the electro-depositable material 24, and may be applied in a substantially identical manner, as described below. The thermally conductive coating 38 may provide a substrate for subsequent deposition of a thermal barrier 40.

Specifically, the thermal barrier 40 may be applied to the thermally conductive coating 38, such that the thermally conductive coating 38 is located between the face sheet 20 and the thermal barrier 40. The thermal barrier 40 may be any coating designed to limit heat flow therethrough. For example, the thermal barrier 40 may be made of gold or other layers of material capable of reflecting radiant heat, or may include one or more layers of insulating materials. Some examples of suitable materials that may be used for one or more layers of the thermal barrier 40 include yttria, yttria-stabilized zirconia, magnesia, calcium oxide stabilized zirconia, aluminum oxide, magnesium oxide, boron nitride, silica, zirconium nitride, titanium, zirconium borides, and the like. Other examples of suitable materials that may be used for a bond coat layer of the thermal barrier 40 include nickel base, aluminum, zinc, and the like. In some embodiments of the invention, the thermal barrier 40 may be applied by a high temperature process, such as flame spray, that may be damaging to the composite material if applied directly to the face sheet 20. Thus, the thermally conductive coating 38 or metallic exoskeleton, applied by a low temperature process such as plating, may protect the underlying composite of the face sheet 20 during the application of the thermal barrier 40.

Additionally or alternatively, the thermal barrier 40 may include one or more insulating material layers that are covered by a reflective layer (not shown). Or, alternatively, both the thermally conductive coating 38 and the thermal barrier 40 may be replaced with a thick, plated metallic layer combining a reflective layer and a metallic exoskeleton. Such reflective layers may be used to reflect at least a portion of the heat received thereby from an aircraft engine in the nacelle 10.

A method of manufacturing the inner wall 16 of the thrust reverser 12 may include the steps of forming the face sheet 20 to a desired shape, placing the core 22 onto the outer face sheet surface 30, and holding the core 22 in a desired position relative to the face sheet 20. Next, the method may include the steps of electrodepositing the electro-depositable material 24 substantially continuously over both the core 22 and the outer face sheet surface 30, thus bonding the face sheet 20 and core 22 together. The method may also include a step of attaching the back sheet 18 to the core 22 at the outer core surface 34, using any techniques known in the art. In some embodiments of the invention, the method may further include the steps of applying the thermally conductive coating 38 to the inner face sheet surface 28 and/or bonding the thermal barrier 40 to the inner face sheet surface 28 or to the conductive coating 38.

Method steps for manufacturing the inner wall 16 will now be described in more detail, in accordance with various embodiments of the present invention. The steps of the method 400 may be performed in the order as shown in FIG.

4, or they may be performed in a different order. Furthermore, some steps may be performed concurrently as opposed to sequentially. In addition, some steps may not be performed.

Figure 4:
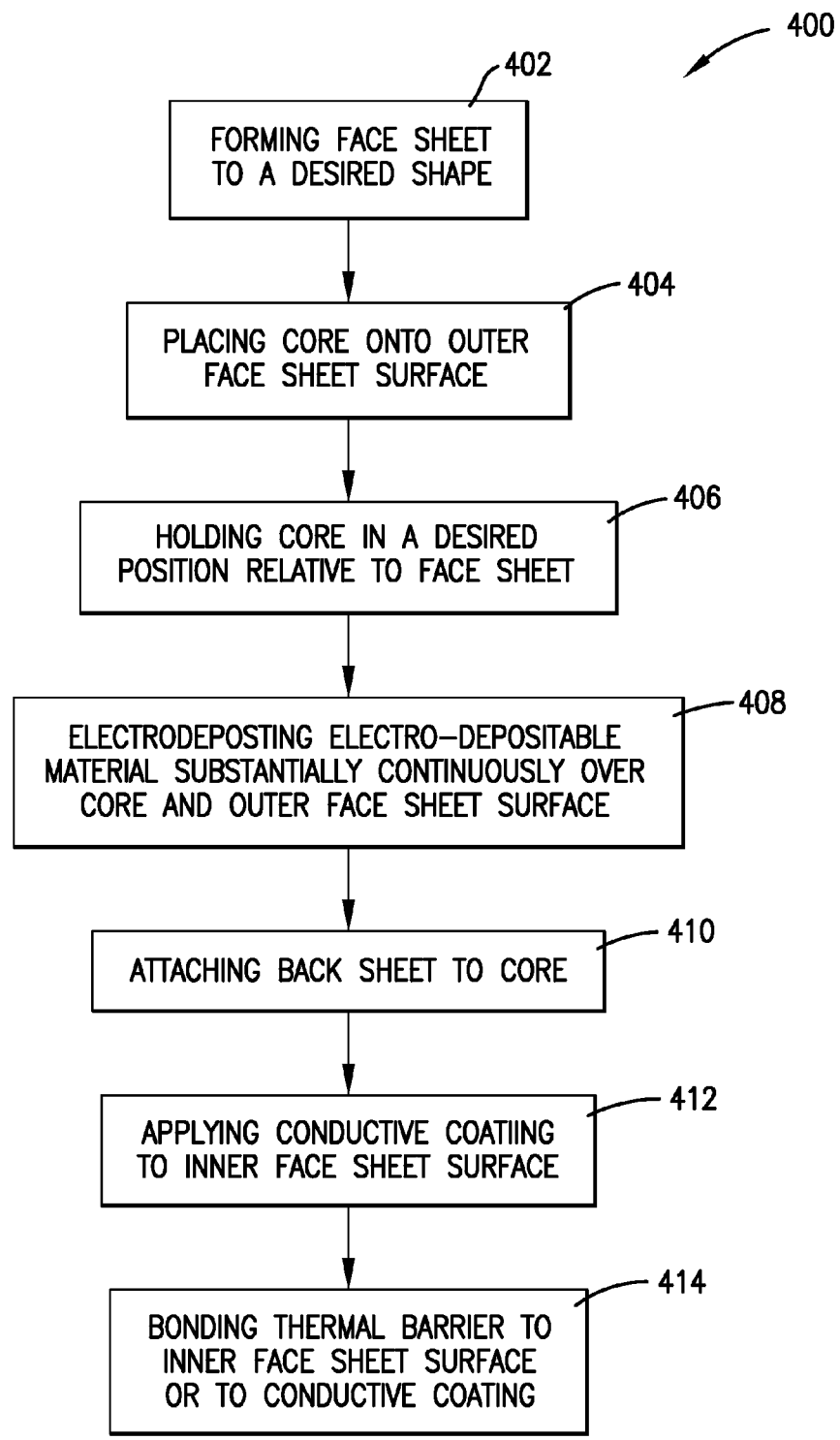
FIG. 4 is a flow chart illustrating a method of manufacturing the inner thrust reverser wall of FIG. 3 in accordance with embodiments of the present invention.

As illustrated in FIG. 4, the method 400 may include a first include a step of forming the face sheet 20 to a desired shape, as depicted in block 402. For example, the face sheet 20 may be curved into a half-shell, C-shaped configuration, as illustrated in FIGS. 1 and 2, with flanges at opposing ends. However, the face sheet 20 may have any shape, size, and configuration used for thrust reverser inner walls, as known in the art.

Next, the method 400 may include the steps of placing the core 22 onto the outer face sheet surface 30, as depicted in block 404, and holding the core 22 in a desired position relative to the face sheet 20, as depicted in block 406. For example, this may include forming the core 22 to the face sheet 20 and holding it in place by spot-welding, tack welding, or brazing the core 22 to the face sheet 20. In other alternative embodiments of the invention, the core 22 may be held in a desired position on the face sheet 20 using mechanical fasteners or the like.

Next, the method 400 may include a step of electrodepositing the electro-depositable material 24 substantially continuously over both the core 22 and the outer face sheet surface 30, as depicted in block 408, thus bonding the face sheet 20 and core 22 together. This step forms a coating or shell encapsulating the face sheet 20 and core 22 and thus, via the electro-depositable material 24, bonds the face sheet 20 and core 22 in the desired position from step 406 above. Electrodeposition, also referred to as electroplating, is generally known in the art as a process that uses electrical current to reduce dissolved metal cations so that they form a coherent metal coating on an electrode. This configuration, as illustrated in FIG. 3, advantageously increases the bond strength between the core 22 and the face sheet 20 and allows the inner wall 16 to handle higher temperatures than traditional polymer bonding agents. Furthermore, in this configuration, heat can be conducted away from the face sheet 20 due to improved thermal conductivity between the face sheet 20 and the core 22 by the presence of the electro-depositable material 24.

The method 400 may also include a step of attaching the back sheet 18 to the core 22 at the outer core surface 34, as depicted in block 410, using any techniques known in the art. The perforations 26 in the back sheet 18 may assist in cooling the electro-depositable material 24, the core, and/or the outer face sheet surface 30. The back sheet 18 may be laser welded, adhesive bonded, or otherwise fixedly attached to the core, electro-depositable material 24, and/or the face sheet 20.

In some embodiments of the invention, the method 400 may further include the steps of applying the thermally conductive coating 38 to the inner face sheet surface 28, as depicted in block 412, and/or bonding or otherwise applying the thermal barrier 40 to the inner face sheet surface 28 or the thermally conductive coating 38, as depicted in block 414. The application of the thermally conductive coating 38 and/or the thermal barrier 40 may be performed using any techniques or methods known in the art. For example, a metallic bond coat layer may be applied via cold spraying or arc spraying on the face sheet 20, then a top coat of thermally-insulative ceramic coating can be applied by thermal spray, flame spray, or the like.

In some embodiments of the invention, the thermally conductive coating 38 may be the metallic exoskeleton electrodeposited onto the inner face sheet surface 28. The thermally conductive coating 38 may reflect at least a portion of the heat received from an aircraft engine, and its conductivity may assist in conducting away heat from localized hot areas of the face sheet 20. Finite element modeling may be used to select optimum scenarios to resist heat at the thermal barrier-coated surface of the thermally conductive coating 38 and/or the face sheet 20. Both the metallic exoskeleton and the electro-depositable material 24 coating the outer face sheet surface 30 and the core 22 may assist in an even distribution of engine heat received by the inner wall 16 of the thrust reverser 12.

As noted above, the face sheet 20, core, and back sheet 18 may be made of a variety of materials. Some combinations of these materials are made possible by the electro-deposition bonding described herein. For example, in one embodiment of the invention, the face sheet 20 may be made of aluminum, the back sheet 18 may be made of perforated carbon fiber reinforced composite, and the core 22 may be made of aluminum and sandwiched between the face sheet 20 and the back sheet 18 as described herein. Advantageously, the method 400 and the inner wall 16 described herein could be used as a higher-performance alternative to polymer matrix composite sandwich structures and a lower-cost alternative to such structures made entirely from titanium.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of manufacturing an aircraft thrust reverser inner wall, the method comprising the steps of:
    forming a face sheet to a desired shape, the face sheet having an inner face sheet surface and an outer face sheet surface;
    placing a core onto the outer face sheet surface, the core having an inner core surface, an outer core surface, and a plurality of cell walls extending between the inner core surface and the outer core surface, the inner core surface being positioned adjacent the outer face sheet surface;
    after the core has been placed onto the outer face sheet surface, electrodepositing an electro-depositable material substantially continuously over at least a portion of the cell walls and the outer face sheet surface so as to form a continuous layer of electro-depositable material over the at least a portion of the cell walls and the outer face sheet surface such that the inner core surface remains adjacent the outer face sheet surface, thereby bonding the face sheet and core together; and
    attaching a back sheet to the core at the outer core surface.

2. The method of claim 1, further comprising a step of applying a thermally conductive coating to the inner face sheet surface.

3. The method of claim 1, further comprising a step of electro-depositing a metallic exoskeleton to the inner face sheet surface.

4. The method of claim 3, further comprising a step of applying or bonding a thermal barrier to the metallic exoskeleton.

5. The method of claim 1, further comprising a step of applying or bonding a thermal barrier to the inner face sheet surface.

6. The method of claim 1, wherein the back sheet is perforated and is made of at least one of carbon fiber reinforced plastic composite (CFRP), aluminum (Al), glass reinforced epoxy (GRE), titanium, and any type of polymer matrix composite (PMC).

7. The method of claim 1, wherein the face sheet is made of at least one of Al, CFRP, GRE, matrix metal composite (MMC), any type of PMC, titanium, nickel base alloy, corrosion resistant steel, and stainless steel.

8. The method of claim 1, wherein the core is a honeycomb core, wherein the core is made of at least one of aluminum alloys, CFRP, GRE, titanium alloy, and nickel base alloy.

9. The method of claim 1, wherein the electro-depositable material includes at least one of nickel, nickel-iron, nickel base alloys, chromium and chromium base alloys, cobalt and cobalt base alloys, copper and copper base alloys, and niobium or tantalum alloys.

10. An aircraft thrust reverser inner wall configured to be placed at least a portion around an aircraft engine, the aircraft thrust reverser inner wall comprising:
    a face sheet shaped to fit around at least a portion of the aircraft engine, the face sheet having an inner face sheet surface and an outer face sheet surface;
    a core disposed against the outer face sheet surface, the core having an inner core surface, an outer core surface, and a plurality of cell walls extending between the inner core surface and the outer core surface, the inner core surface contacting the outer face sheet surface;
    electro-depositable material that is applied in a substantially continuous layer over at least a portion of the cell walls and the outer face sheet surface after the core has been disposed against the outer face sheet surface such that the inner core surface remains in contact with the outer face sheet surface, thereby bonding the face sheet and core together; and
    a back sheet attached to the core at the outer core surface, wherein the back sheet is perforated.

11. The aircraft thrust reverser inner wall of claim 10, further comprising a thermally conductive coating applied to the inner face sheet surface.

12. The aircraft thrust reverser inner wall of claim 10, further comprising a metallic exoskeleton applied via electro-deposition to the inner face sheet surface.

13. The aircraft thrust reverser inner wall of claim 12, further comprising a thermal barrier bonded to the metallic exoskeleton or to the inner face sheet surface.

14. The aircraft thrust reverser inner wall of claim 10, wherein the back sheet is made of at least one of carbon fiber reinforced plastic composite (CFRP), aluminum (Al), glass reinforced epoxy (GRE), titanium, and any type of polymer matrix composite (PMC).

15. The aircraft thrust reverser inner wall of claim 10, wherein the face sheet is made of at least one of Al, CFRP, GRE, metal matrix composite (MMC), any type of PMC, titanium, nickel base alloy, corrosion resistant steel, and stainless steel.

16. The aircraft thrust reverser inner wall of claim 10, wherein the core is a honeycomb core, wherein the core is made of at least one of aluminum alloys, CFRP, GRE, titanium alloy, and nickel base alloy.

17. The aircraft thrust reverser inner wall of claim 10, wherein the electro-depositable material includes at least one of nickel, nickel-iron, nickel base alloys, chromium and chromium base alloys, cobalt and cobalt base alloys, copper and copper base alloys, and niobium or tantalum alloys.

18. An aircraft thrust reverser inner wall configured to be placed at least a portion around an aircraft engine, the aircraft thrust reverser inner wall comprising:
    a face sheet shaped to fit around at least a portion of the aircraft engine, the face sheet having an inner face sheet surface and an outer face sheet surface;
    a core disposed against and bonded with the outer face sheet surface, the core having an inner core surface, an outer core surface, and a plurality of cell walls extending between the inner core surface and the outer core surface, the inner core surface contacting the outer face sheet surface;
    electro-depositable material that is applied in a substantially continuous layer over the outer core surface, the cell walls, and the outer face sheet surface after the core has been disposed against the outer face sheet surface such that the inner core surface remains in contact with the outer face sheet surface and such that the electro-depositable material forms a shell encapsulating the core and face sheet, thereby bonding the face sheet and core together;
    a back sheet attached to the core at the outer core surface, wherein the back sheet is perforated; and
    a conductive coating applied to the inner face sheet surface.

19. The aircraft thrust reverser inner wall of claim 18, wherein the conductive coating is a metallic exoskeleton applied via electro-deposition to the inner face sheet surface, wherein the aircraft thrust reverser inner wall further comprises a thermal barrier bonded to the metallic exoskeleton or to the inner face sheet surface.

20. The aircraft thrust reverser inner wall of claim 18, wherein the back sheet is made of at least one of carbon fiber reinforced plastic composite (CFRP), aluminum (Al), glass reinforced epoxy (GRE), titanium, and any type of polymer matric composite (PMC), wherein the face sheet is made of at least one of Al, CFRP, GRE, matrix metal composite (MMC), any type of PMC, titanium, nickel base alloy, corrosion resistant steel, and stainless steel, wherein the core is a honeycomb core and is made of at least one of aluminum alloys, CFRP, GRE, titanium alloy, and nickel base alloy, wherein the electro-depositable material includes at least one of nickel, nickel-iron, nickel base alloys, chromium and chromium base alloys, cobalt and cobalt base alloys, copper and copper base alloys, and niobium or tantalum alloys.

* * * * *